US005204163A

United States Patent [19]

Nakatsuka et al.

[11] Patent Number: 5,204,163

[45] Date of Patent: Apr. 20, 1993

[54] SHEET FOR FORMATION OF BURNED PATTERN AND BURNING LABEL

[75] Inventors: Hiroshi Nakatsuka; Kazuhiro Tajiri; Takafumi Sakuramoto; Yozo Oishi, all of Osaka, Japan

[73] Assignee: Nitto Denko Corporation, Osaka, Japan

[21] Appl. No.: 514,806

[22] Filed: Apr. 26, 1990

[30] Foreign Application Priority Data

Apr. 26, 1989 [JP] Japan ................................ 1-106814

[51] Int. Cl.[5] ................................................ B32B 3/00

[52] U.S. Cl. ................................ 428/195; 428/306.6; 428/312.6; 428/317.9; 428/324; 428/363; 428/403; 40/616; 40/625; 40/628

[58] Field of Search .................. 428/195, 306.6, 312.6, 428/317.9, 324, 363, 403; 40/616, 625, 628

[56] References Cited

U.S. PATENT DOCUMENTS 4,247,364 1/1981 Cup .................................... 428/363
4,509,988 4/1985 Bernhard ............................ 428/363

FOREIGN PATENT DOCUMENTS 0128717 12/1984 European Pat. Off. .
0306727 3/1989 European Pat. Off. .

OTHER PUBLICATIONS

Japanese Patents Gazett, Section CH, Week 8147, 9th Oct. 1981, No. 81-86192D.
Japanese Patents Gazette, Section CH, Week 8221, 14th Apr. 1982, No. 82-42135E.

*Primary Examiner*—Patrick J. Ryan
*Assistant Examiner*—Elizabeth Evans
*Attorney, Agent, or Firm*—Sughrue, Mion, Zinn, Macpeak & Seas

[57] ABSTRACT

A sheet for formation of a burned pattern and a burning label are disclosed. The sheet comprises a shape retaining layer comprising an organic binder and glass powder which is retained in a sheet form by the organic binder, the shape retaining layer further comprising mica powder covered with an oxide type ceramic compound.

6 Claims, No Drawings

SHEET FOR FORMATION OF BURNED PATTERN AND BURNING LABEL

FIELD OF THE INVENTION

The present invention relates to a sheet for formation of a burned pattern which is prepared using mica based inorganic powder and glass powder, and which is used to form a burned body excellent in covering power and reflectance, and a burning label comprising the above sheet.

BACKGROUND OF THE INVENTION

With the change in the production system for production of a variety of products but in a small number, as an identification label for use in administration of products made of metal, glass, sintered ceramics, etc., half products or parts, for example, a sheet for formation of a burned pattern as obtained by forming a sheet using glass powder and a wax binder has been proposed, because the conventional substrate type identification labels comprising sintered ceramics, metal or enamel have problems such as a problem of time spending for fixing with a screw, etc., a problem of lack of fixation on a curved surface because of stiffness, and a problem of lack of instant formation in a desired manner of the identification label due to provision of a pattern on a spot. These sheets are designed so that a burned body is fixed to an adherend member by burning, has a flexible and expedient label forming ability, and its burned body is excellent in weather resistance, heat resistance and chemical resistance.

However, such conventional sheets for formation of a burned pattern have problems in that its burned body is poor in covering power and reflectance, and the color of the background of the adherend member is reflected and, therefore, it is difficult to provide sufficient contrast between the pattern and the background.

In order to overcome the above problems, the present inventors attempted to introduce ceramic powder to the conventional sheets as described in JP-A-1-73086 and JP-A-2-0191. (The term "JP-A" as used herein means an unexamined published Japanese patent application.) However, it has been revealed that the covering power of the burned body is sometimes not improved. Furthermore, the reflectance is varied depending on burning conditions, and therefore severe control of the burning conditions is required.

SUMMARY OF THE INVENTION

An object of the present invention is to provide a sheet for formation of a burned pattern and a burning label, the burned body of which is excellent in covering power and reflectance, which can be obtained stably without severe control of the burning conditions.

Other objects and effects of the present invention will be apparent from the following description.

As a result of extensive investigations to develop a sheet for formation of a burned pattern from which a burned body excellent in covering power and reflectance can be stably formed, the present inventors have found that the object can be attained by using mica powder covered with an oxide type ceramic compound.

The present invention provides a sheet for formation of a burned pattern, which comprises a sheet for formation of a burned pattern comprising a shape retaining layer comprising an organic binder and glass powder which is retained in a sheet form by the organic binder, the shape retaining layer further comprising mica powder covered with an oxide type ceramic compound.

The present invention further provides a burning label comprising the above sheet for formation of a burned pattern which has provided therewith a pattern.

DETAILED DESCRIPTION OF THE INVENTION

The above sheet for formation of a burned pattern is flexible and can be easily applied to the curved surface of an adherend, and can instantly provide a pattern, an identification form or the like in the desired manner by an engraving method, a punching method, or a suitable printing system such as with a thermal transferring printer.

The sheet for formation of a burned pattern is converted into a burned body by burning while maintaining the provided pattern or form, and at this time, a melted glass component functions as an adhesive for fixing to the adherend member. As a result, a burned pattern excellent in heat resistance, weather resistance and chemical resistance can be formed. Furthermore, because the burned pattern contains mica powder covered with an oxide type ceramic compound, the burned pattern is free from discoloration due to burning of the glass powder, and is rarely influenced by the extent of burning such as the extent of melt-fixation. Thus, the burned pattern stably has high reflectance and excellent covering power and possesses a good contrast relative to the pattern.

In the sheet for formation of a burned pattern of the preset invention, the shape retaining layer as obtained by forming glass powder into a sheet form with an organic binder further contains mica powder covered with an oxide type ceramic compound. The form of the sheet may be such that: the sheet consists of the shape retaining layer only; the shape retaining layer is provided on a supporting substrate; the shape retaining layer is reinforced with a reinforcing layer such as a resin layer, a film layer, etc.; or the sheet has an adhesive layer. In any way, the above shape retaining layer is sufficient to be in the form of a sheet.

Mica powder for use in formation of the shape retaining layer may be natural mica or synthetic mica. The mica powder is generally in a flake form, preferably having a size of 5 to 200 μm, more preferably 6 to 50 μm, particularly preferably 6 to 20 μm, and a thickness of about 1/50 to 1/100 of the size, and is covered with an oxide type ceramic compound. In connection with the covering form, in general, powder of an oxide type ceramic compound is attached to the surface of the mica powder and preferably in an amount of not more than 20% by weight, more preferably 5 to 15% by weight, of the mica powder. The size of the oxide type ceramic compound powder to be attached varies depending on the size of the mica powder and is generally not more than 1 μm, and preferably 0.1 to 0.5 μm.

The term "oxide type ceramic compound" used herein means not only oxide type ceramics itself, but also a compound, such as carbonate, nitrate or sulfate, capable of being coverted into the oxide type ceramics by oxidation at the time of burning.

The oxide type ceramic compound to be compounded can be selected appropriately depending on the desired color for the burned body. For example, in the case of coloring in white, oxide type ceramics such as silica, zirconia, titania, alumina, zinc white, and calcium oxide, or compounds such as carbonate, nitrate and sulfate to be converted int such oxide type ceramics by oxidation can be used. Among these, titania, zirconia and alumina are particularly preferred.

As the method for attaching the oxide type ceramic powder to the mica powder, any of conventional methods can be used in the present invention. For example, the oxide type ceramic powder and the mica powder are mixed by high speed shearing at a temperature lower than the melting points thereof, so as to attach the oxide type ceramic powder to the mica powder by the mechanochemical action.

As the glass powder, glass powder which softens or melts at a predetermined burning temperature, and fixes to the adherend material can be used. Therefore, any of known glass powders can be used. The burning temperature is generally 400° to 850° C., although it can be determined appropriately depending on the heat resistance, etc. of the adherend material. Examples of the glass powder which are used in the case of burning temperature in the above range include lead glass (preferred burning temperature: 400° to 600° C.), borosilicate lead glass (preferred burning temperature: 500√ to 850° C.), and soda glass (preferred burning temperature: 500° to 850° C.). The glass powder may be used singly or in combination depending on the burning temperature and the adherend material.

As the glass powder to be used, those exhibiting a similar color to the ceramic covering the above mica powder after burning is preferably used. The shape of the glass powder is preferably irregular or spherical. The average diameter of the glass powder is preferably 1.5 to 10 μm.

As the organic binder, those to be lost by burning at the time of burning are used, and those excellent in shape retaining ability and flexibility providing ability are preferably used. Examples of organic binders which are preferably used include hydrocarbon resins, vinyl resins, styrene resins, acetal resins, butyral resins, acryl resins, polyester resins, urethane resins and cellulose resins. From a viewpoint of burning properties, hydrocarbon resins, acetal resins, acryl resins and cellulose resins are preferred, with acryl resins being particularly preferred. Preferred examples of the acryl resins include polymethyl methacrylate, polyethyl methacrylate, polybutyl methacrylate and copolymers of these polymers and acrylic acid. When the sheet for formation of a burned pattern as described above is provided with the reinforcing layer on the surface or in the inside of the shape retaining layer, the reinforcing layer is preferably formed with the aforementioned resin or its film. The thickness of the reinforcing layer is preferably 10 to 50 μm.

As the reinforcing layer, materials which are not lost but are united with the shape retaining layer by burning can be used. Examples thereof include glass cloth, glass nonwoven cloth, ceramic paper, etc.

Formation of the shape retaining layer can be carried out, for example, by a method in which mica powder covered with an oxide type ceramic compound is mixed with glass powder and one or more organic binders using a solvent in a ball mill, etc. and the resulting mixture is spread on a supporting substrate such as a separator by a suitable method and then dried.

In connection with the proportion of the mica powder and the glass powder, it is preferred that the ratio of the mica powder is from 3 to 90% by weight and the ratio of the glass powder is from 97 to 10% by weight, based on the total of the mica powder and the glass powder, and it is more preferred that the ratio of the mica powder is from 5 to 40% by weight and the ratio of the glass powder is from 95 to 60% by weight, based on the total of the mica powder and the glass powder. The amount of the organic binder used is preferably from 20 to 80 parts by weight, more preferably from 25 to 40 parts by weight, per 100 parts by weight of the total of the mica powder and the glass powder.

The solvent used for preparing the mixture is not particularly limited. Examples of the solvent include butyl carbitol, ethyl acetate, butylcellosolve acetate, methyl ethyl ketone, methyl isobutyl ketone, toluene and the like. The solvent is preferably used in such an amount that the concentration of the organic binder is from 5 to 40% by weight.

In preparation of the mixture, if necessary, known additives such as a plasticizer, a dispersing agent, a combustion aid, a defoaming agent and the like can be compounded generally in an amount of from 0.5 to 20 parts by weight per 100 parts by weight of the binder. Burned body forming components other than the mica powder and the glass powder, such as inorganic powder or fibers, e.g., ceramics, metals or alloys, or their oxides, pigments and fillers, may be used in combination if necessary. The size of the inorganic powder is preferably from 0.1 to 20 μm, and in the case of the inorganic fiber, it is as long as not more than 100 μm. The amount of the other burned body forming components used is generally not more than 50% by weight of the mica powder. Burned body forming components other than the glass powder and the mica powder are incorporated into the burned body while maintained in a softened or melted form of glass powder at the time of burning.

As the method of spreading the mixture, a method excellent in precision of controlling the layer thickness, for example, a doctor blade method is preferably employed. The thickness of the shape retaining layer to be formed can be determined appropriately depending on the purpose of use, and is preferably from 10 μm to 5 mm, and more preferably from 20 μm to 1 mm.

An adhesive layer may be provided on the sheet for formation of a burned pattern, if necessary, to attain the temporary fixation onto the adherend member. The adhesive layer is formed so as to be lost at the time of burning. Accordingly, the adhesive layer forming agent is sufficient to be such that it has an adhesive force to be temporarily fixed to the adherend member and it is lost by thermal decomposition at a temperature lower than the burning temperature. In general, a rubber adhesive, an acryl adhesive, a vinyl alkyl ether adhesive and the like are used. Preferably, a rubber adhesive comprising natural rubber or synthetic rubber having similar nature as natural rubber; a rubber adherend composed of one of polymers such as butyl rubber, polyisobutyl rubber, styrene-butadiene rubber, styrene-isobutyrene-styrene block copolymer rubber, and styrene-butadiene-styrene block copolymer rubber; a rubber adhesive as obtained by adding 10 to 300 parts by weight of an adhesion providing resin such as a petroleum resin, a cumarone indene resin or a xylene resin, and other additives such as a softening agent, an aging agent, a colorant and a filler to 100 parts by weight of the above polymer; or an acryl adhesive containing a polymer of an alkyl ester of acrylic acid or methacrylic acid as a main component are used.

The adhesive layer may be provided by a suitable method according to a conventional method of formation of an adhesive tape, etc. such as a method in which the adhesive layer provided on separator by a reverse coater, a gravure coater, etc. is transferred, and a method in which the adhesive layer is provided on the shape retaining layer or the sheet for formation of a burned pattern by the use of a coating machine. The thickness of the adhesive layer to be provided may be determined appropriately depending on the purpose of use is preferably from 1 to 500 μm.

The sheet for formation of a burned pattern of the present invention may be used, for example, in such a manner that the sheet is temporarily fixed to an adherend material and then burned. During burning, the burned body is fixed to the adherend material. In this case, there can be employed a method in which an adherend material is provided on the sheet for formation of a burned pattern and then burned to thereby fix the adherend material through the burned body of the sheet for formation of a burned pattern. Burning may be carried out under suitable heating conditions depending on the type of the glass powder used.

One embodiment of the burning label of the present invention is prepared by providing a pattern comprising a heat resistant ink, or a pattern made of pores or irregularities on the above sheet for formation of a burned pattern. The burning label in another embodiment is prepared by punching the sheet for formation of a burned pattern in a desired form. Of course, the burning label may be a combination of two or more of the above embodiments.

As the heat resistant ink to be used for providing a pattern to the sheet for formation of a burned pattern, an ink in a paste form as obtained by mixing glass powder, inorganic pigment, etc. with a binder can be used. Typical examples include heat resistant inks for low temperature burning (at 1,000° C. or lower) used in the direct coating system by the conventional screen printing system or the transferring system of a coated pattern formed on a transferring paper. In connection with the composition of the heat resistant ink after burning, it generally comprises from 0 to 95% by weight of glass powder, from 100 to 5% by weight of a coloring component such as inorganic pigment, and from 5 to 50% by weight of a burning residual component of the binder which is used if necessary.

The method of formation of a pattern using the heat resistant ink is not limited. A hand writing method, a coating method through a pattern formation mask, a method of transferring a pattern provided on a transferring paper, a method of forming a pattern with a printer, or a like suitable pattern forming method may be employed. The pattern to be formed is not limited. Any desired pattern such as a printed pattern, a transferred pattern, a picture pattern or a bar code pattern may be formed.

An ink sheet such as a printing ribbon which is needed in the formation of a pattern with a printer such as an XY plotting printer, a wire dot printer, a heat transferring printer or an impact printer can be prepared by providing a heat resistant ink on a substrate such as a film or a cloth by techniques such as a coating method and a dipping method. Formation of a pattern with a printer has an advantage in that a suitable pattern can be formed with high precision and high efficiency.

In the case of formation of an identification label using the burning label of the present invention, it is preferred that a heat resistant ink is used which is prepared using a coloring component such as pigment different from that of the shape retaining layer of the sheet for formation of a burned pattern, so that a good contrast or a difference in color tone is formed between the background and the pattern.

A method of forming a burned label by engraving a pattern of pores or irregularities in the sheet for formation of a burned pattern is not limited. Also the pattern to be formed is not limited. In the pore pattern, there may be employed any suitable display method such as a method in which pore parts indicate a display content, and a method in which the sheet remainder other than the pore parts indicates a display content. In addition, a method may be employed in which a pore-line pattern of the punching pattern is formed in the sheet for formation of a burned pattern, and in the final stage, only an inside portion in the pore-line pattern is left in the adherend material. This method can be preferably employed in the formation of a bar code pattern or a picture pattern. This is also advantageous in the case where the punching is difficult to employ because the punched product is readily broken. The pattern of irregularities can be utilized in the formation of an identification label such as a bar code pattern to be applied to a reflected light detection type sensor, as well as the case of decoration.

A pattern or shape may be provided to the sheet for formation of a burned pattern to thereby form the aforementioned burned label before or after the temporary fixation of the sheet for formation of a burned pattern to the adherend material. In the former case, a burned label is formed in advance, and thus there can be obtained an advantage that a pattern of high precision can be provided by the use of a suitable apparatus. In the latter case, a burned label is formed by treating the sheet for formation of a burned sheet that has been temporarily fixed to the adherend material, and thus there can be obtained an advantage that an irregularity pattern can be formed under temporary fixation, or an advantage that a deformation in the irregular pattern due to the temporary fixation can be prevented, that is, the pattern is maintained with ease.

In the present invention, an overcoat layer comprising an organic binder and glass powder, which is retained in a sheet form by the organic binder, may be provided on the above-described sheet for formation of a burned pattern, and the combined sheet having the two-layer structure thus obtained may be used as the sheet for formation of a burned pattern of the present invention. The overcoat layer may contain additives such as pigments. The thickness of the overcoat layer is preferably 50% or less, more preferably from 5 to 30%, of the thickness of the shape retaining layer.

When the above overcoat layer is provided, the sheet for formation of a burned pattern of the present invention is temporarily fixed to an adherend material in such a manner that the overcoat layer is outside, followed by burning.

Examples of the organic binder and the glass powder used in the overcoat layer include those for the sheet for forming a burned pattern of the present invention as mentioned above. When a pattern is provided with the sheet having the two-layer structure above, a pattern can be provided on the overcoat layer or between the overcoat layer and the shape retaining layer by the above-described manner. By providing the overcoat layer, i.e., using the sheet having a two-layer structure, the slipping property and anti-contamination property of the resulting burned body and the fixing property of the ink used as a pattern can be improved.

By burning the burning label fixed temporarily to the adherend material, at a predetermined temperature, it is fixed to the adherend material, as a burned body.

Accordingly, the burning label can be preferably used for providing a picture or an identification label to porcelain or glass products and enamel products. In addition, the burning label can be preferably used for providing an identification label comprising the name of company, the lot number, the name of product, the person to which goods are delivered, the export country, other desired identification signals, color or a color pattern, or a bar code to products of glass, ceramics or metals, or the convey palettes, particularly ceramic substrates or samples.

When the adherend material is made of ceramics which have not yet been sintered, burning of the sheet for formation of a burned pattern or the burning label can be carried out simultaneously with the sintering or heat treatment of the adherend material.

The sheet for formation of a burned pattern or the burning label of the present invention is flexible, can be easily applied to the material having varies surfaces such as a curved surface, and can instantly provide a pattern in the desired manner.

The sheet for formation of a burned pattern or the burning label of the present invention is excellent in an ability to retain the shape or pattern at the time of burning, and the resulting burned body is excellent in weather resistance, heat resistance and chemical resistance, and also in the fixation force to the adherend material.

In addition, since the sheet for formation of a burned pattern or the burning label contains mica powder, it is excellent in covering power and reflectance and is excellent in pattern identification because it rarely reflects the color and fine irregularities of the adherend material.

The present invention is described in greater detail with reference to the following examples, but the present invention is not construed as being limited thereto.

EXAMPLE 1

85 parts (by weight, hereinafter all parts are by weight) of glass powder (average diameter: 3.5 μm) containing PbO (75 wt %), $SiO_2$ (10 wt %), $B_2O_3$ (10 wt %) and $Al_2O_3$ (5 wt %) as main components, 15 parts of mica powder having an average particle diameter of 10 μm and an average thickness of 3.0 μm, and covered with titania powder having an average particle diameter of 0.3 μm and 20 parts of a binder (polybutyl methacrylate having a molecular weight of 20,000) were uniformly mixed in a ball mill by the use of 40 parts of toluene to prepare a paste. The amount of the titania was 12% by weight based on the amount of the mica. This paste was spread on a polyester film treated with a peeling agent, with a doctor blade type coater, and then dried to form an about 100 μm thick shape retaining layer. To this layer was bonded an about 20 μm thick acryl adhesive formed on a separator (a polyethyleneterephthalate film having a thickness of 50 μm coated with a silicone releasing agent) with a gravure coating machine, and then the polyester film treated with the peeling agent was peeled apart to obtain a sheet for formation of a burned pattern.

On the surface of the shape retaining layer of the above sheet for formation of a burned pattern, a predetermined bar code was formed by the use of a thermal transferring printer through an ink sheet to thereby obtain a burning label. The ink sheet was prepared by coating a heat resistant ink comprising a mixed paste of 20 parts of a chromium oxide/iron oxide/cobalt oxide based black pigment, 20 parts of paraffin wax and 60 parts of toluene on a polyester film and then drying.

The burning label was temporarily fixed to a glass plate through the adhesive layer, and the separator was peeled apart from the above burning label. The burning label was then burned for 30 minutes at 450° C., 500° C. or 550° C. As a result of burning, the organic components such as the acryl resin binder were lost by burning.

By the above procedures, there was obtained a glass plate to which the burning label having a sharp black bar code pattern on the white background was fixed firmly. The reflectance of light on the white background of the burning label was measured. The results obtained are shown in the Table 1 below. The wavelength for the measurements was 400 to 800 nm.

EXAMPLE 2

Except for using 85 parts of glass powder (average diameter: 4.0 μm) containing PbO (60 wt %), $B_2O_3$ (20 wt %) and ZnO (20 Wt %) as main components, 15 parts of mica powder having an average particle diameter of 15 μm and covered with alumina powder having an average particle diameter of 0.8 μm and an average thickness of 4.0 μm, 20 parts of a binder (polyethyl methacrylate having a molecular weight of 150,000) and 40 parts of toluene, a burning label was produced in the same manner as in Example 1. The amount of the alumina was 15% by weight based on the amount of the mica. It was then fixed to a glass plate by burning in the same manner as in Example 1.

By the above procedures, there was obtained a glass plate to which a burning label having a sharp black bar code patter on the white background was fixed firmly. The reflectance of the white background of the burning label was measured. The results obtained are shown in the Table 1 below. The wavelength for the measurements was 400 to 800 nm.

EXAMPLE 3

A mold having a predetermined pattern made of irregularities was pressed to a sheet for formation of a burned pattern (30 mm×50 mm) as obtained in Example 1 to obtain a burning label. After peeling apart the separator, the label was temporarily fixed through the adhesive layer to the glass plate and then burned at 500° C. for 30 minutes.

By the above procedures, there was obtained a glass plate to which a white burning label having the above pattern was fixed firmly.

EXAMPLE 4

A burning label was produced in the same manner as in Example 1 except that an overcoat layer having a thickness of 20 μm was provided on the shape retaining layer by hot pressing. The overcoat layer was composed of 70 parts by weight of the glass powder and 30 parts of the binder both which were the same as in Example 1. It was then fixed to a glass plate by burning in the same manner as in Example 1.

By the above procedures, there was obtained a glass plate to which a burning label having a sharp black bar code patter on the white background was fixed firmly.

The reflectance of the white background of the burning label was measured. The results obtained are shown in the Table 1 below. The wavelength for the measurements was 400 to 800 nm.

COMPARATIVE EXAMPLE 1

A burning label was produced in the same manner as in Example 1 except that titania powder having an average particle diameter of 0.2 μm was used in place of the mica powder subjected to covering treatment, and then fixed to a glass plate by burning in the same manner as in Example 1. The reflectance on the white background of the burning label was measured. The results obtained are shown in the Table 1 below. The wavelength for the measurements was 400 to 800 nm.

TABLE 1

| | Reflectance (%) | | |
|---|---|---|---|
| | Burning temperature | | |
| | 450° C. | 500° C. | 550° C. |
| Example 1 | 85 | 83 | 80 |
| Example 2 | 80 | 78 | 75 |
| Example 4 | 80 | 77 | 74 |
| Comparative Example 1 | 70 | 30 | 20 |

From the results of the Table 1, it can be understood that the burning labels using mica powder of the present invention are small in a deviation in reflectance due to burning conditions.

While the invention has been described in detail and with reference to specific examples thereof, it will be apparent to one skilled in the art that various changes and modifications can be made therein without departing from the spirit and scope thereof.

What is claimed is:

1. A fixing label comprising a sheet for formation of a fixed pattern comprising a shape retaining layer comprising an organic binder and glass powder which is retained in a sheet form by said organic binder, said shape retaining layer further comprising mica powder covered with an oxide ceramic or a compound capable of being converted into an oxide ceramic by oxidation, wherein said sheet is provided with a pattern.

2. A fixing label as claimed in claim 1, wherein said pattern comprises a heat resistant ink.

3. A fixing label as claimed in claim 1, wherein said pattern is made of pores or irregularities.

4. A fixing label as claimed in claim 1, wherein said pattern is obtained by punching said sheet for formation of a fixed pattern.

5. A sheet for formation of a fixed pattern comprising a shape retaining layer comprising an organic binder and glass powder which is retained in a sheet form by said organic binder, said shape retaining layer further comprising mica powder covered with an oxide ceramic or a compound capable of being converted into an oxide ceramic by oxidation, said sheet having provided on one side thereof an overcoat layer comprising an organic binder and glass powder which is retained in a sheet form by said organic binder.

6. A fixing label comprising a sheet for formation of a fixed pattern comprising a shape retaining layer comprising an organic binder and glass powder which is retained in a sheet form by said organic binder, said shape retaining layer further comprising mica powder covered with an oxide ceramic or a compound capable of being converted into an oxide ceramic by oxidation, said sheet having provided on one side thereof an overcoat layer comprising an organic binder and glass powder which is retained in a sheet form by said organic binder, wherein said overcoat layer is provided with a pattern.

* * * * *